United States Patent [19]
Gates et al.

[11] Patent Number: 5,613,479
[45] Date of Patent: Mar. 25, 1997

[54] PRESSURE FEEDBACK EXHAUST GAS RECIRCULATION SYSTEM

[75] Inventors: Freeman C. Gates, Bloomfield Hills; Gregory McCliment, Royal Oak; Joseph W. Pratt, Plymouth, all of Mich.

[73] Assignee: Ford Motor Company, Dearborn, Mich.

[21] Appl. No.: 569,385

[22] Filed: Dec. 8, 1995

[51] Int. Cl.$^6$ .............................. F02M 25/07; G01F 1/42
[52] U.S. Cl. ........................ 123/568; 123/571; 73/861.61; 73/861.52
[58] Field of Search .................... 123/568, 569, 123/570, 571; 73/861.52, 861.61

[56] References Cited

U.S. PATENT DOCUMENTS

| | | | |
|---|---|---|---|
| 4,150,648 | 4/1979 | Ogita | 123/568 |
| 4,187,811 | 2/1980 | Katoh et al. | 123/568 |
| 4,240,294 | 12/1980 | Grande | 73/861.52 |
| 4,398,525 | 8/1983 | Ahrns et al. | 123/568 |
| 4,602,606 | 7/1986 | Kawagoe et al. | 123/569 |
| 4,690,120 | 9/1987 | Egle | 123/571 |
| 5,086,655 | 2/1992 | Fredericks et al. | 73/861.61 |
| 5,113,835 | 5/1992 | Seki et al. | 123/571 |
| 5,188,086 | 2/1993 | Adkins et al. | 123/568 |
| 5,203,313 | 4/1993 | Rotarius | 123/568 |
| 5,241,940 | 9/1993 | Gates et al. | 123/568 |
| 5,351,669 | 10/1994 | Herzog | 123/568 |
| 5,515,833 | 5/1996 | Cullen et al. | 123/571 |

*Primary Examiner*—Willis R. Wolfe
*Attorney, Agent, or Firm*—Jerome R. Drouillard, Esq.; Roger L. May, Esq.

[57] ABSTRACT

A pressure feedback EGR system including an EGR tube having a metering orifice therein and extending between an exhaust passageway and an intake passageway of the internal combustion engine, a first pressure tap connected to the EGR tube on one side of the metering orifice, a second pressure tap connected to the EGR tube on the other side of the metering orifice, and the first pressure tap and the second pressure tap each having an end disposed within the EGR tube and with each end being partially closed to form an orifice extending therethrough to reduce noise from pulsations across the metering orifice.

20 Claims, 4 Drawing Sheets

PRESSURE FEEDBACK EXHAUST GAS RECIRCULATION SYSTEM

BACKGROUND OF THE INVENTION

1. Field of the Invention

The present invention relates generally to exhaust gas recirculation systems for internal combustion engines and, more specifically, to a pressure feedback exhaust gas recirculation system for an internal combustion engine.

2. Description of the Related Art

It is known to provide an exhaust gas recirculation (EGR) system for an internal combustion engine. Generally, the EGR system includes an EGR tube having a metering orifice and which extends between an exhaust passage and an intake passage for the internal combustion engine. The EGR system also includes an EGR valve which allows or restricts flow from the EGR tube to the intake passage and an engine vacuum regulator connected to the EGR valve to regulate the EGR valve. The EGR system further includes an electronic control unit connected to the engine vacuum regulator to provide a signal to duty cycle the engine vacuum regulator and, in turn, the EGR valve.

In recent years, a sensor has been added to the EGR system to measure a pressure difference across the metering orifice and connected by silicone rubber tubes to an upstream side and downstream side of the metering orifice to provide a pressure feedback EGR system. Although this pressure feedback EGR system has worked well, it suffers from the disadvantage that noise emanates from the EGR system due to exhaust pulsations across the metering orifice which are transmitted through the silicon rubber tubes. Another disadvantage of the pressure feedback EGR system is that an imbalance in the exhaust pulsations across the metering orifice causes drift in the sensor which is undesired.

SUMMARY OF THE INVENTION

Accordingly, the present invention is a pressure feedback EGR system including an EGR tube having a metering orifice therein and extending between an exhaust passageway and an intake passageway of the internal combustion engine. The pressure feedback EGR system also includes a first pressure tap connected to the EGR tube on one side of the metering orifice and a second pressure tap connected to the EGR tube on the other side of the metering orifice. The first pressure tap and the second pressure tap each have an end disposed within the EGR tube and with each end being partially closed to form an orifice extending therethrough to reduce noise from pulsations across the metering orifice.

One advantage of the present invention is that a noise reduced pressure feedback EGR system is provided for an internal combustion engine. Another advantage of the present invention is that the pressure feedback EGR system has a restrictor/orifice on the pressure taps internal to the EGR tube. Yet another advantage of the present invention is that the pressure feedback EGR system has a restrictor/orifice which is self-contained. Still another advantage of the present invention is the pressure feedback EGR system has a significant reduction of audible noise due to the reduction of the peak amplitude of the exhaust pulsations in the EGR system. A further advantage of the present invention is the pressure feedback EGR system has a reduction of sensor output drift due to unbalanced pressure pulses.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
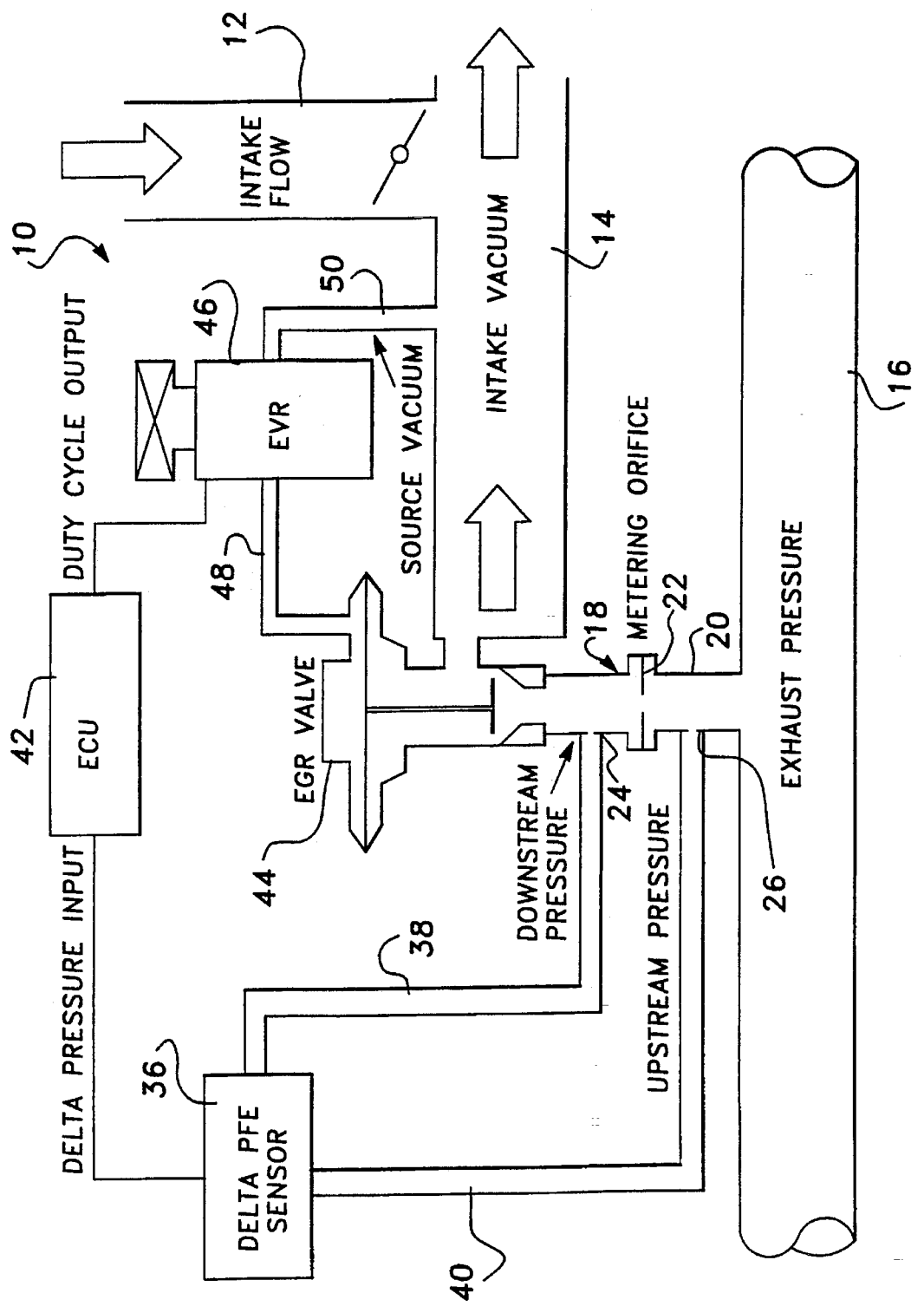
FIG. 1 is a schematic diagram of a pressure feedback exhaust gas recirculation system according to the present invention.

Referring to FIG. 1, one embodiment of a pressure feedback exhaust gas recirculation (EGR) system 10, according to the present invention, is shown for an internal combustion engine (not shown). The EGR system 10 includes a first or intake flow passageway 12 for intake flow to cylinders (not shown) of the internal combustion engine. The EGR system 10 also includes a second or intake vacuum passageway 14 for intake vacuum which combines with the intake flow to flow into the cylinders of the internal combustion engine. The EGR system 10 includes a third or exhaust passageway 16 for the flow of exhaust gases from the cylinders of the engine. It should be appreciated the EGR system 10 regulates the flow of the exhaust gases back to the intake flow for the cylinders of the internal combustion engine.

The EGR system 10 further includes an EGR tube or member, generally indicated at 18, interconnecting the exhaust passageway 16 and the intake vacuum passageway 14. The EGR tube 18 has a tubular body 20 and a sharp edge metering orifice 22 disposed therein. It should be appreciated that the metering orifice 22 may be of a venturi type which is conventional and known in the art.

Figure 2:
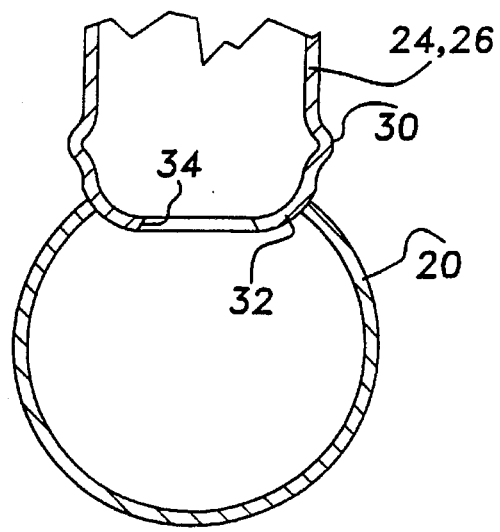
FIG. 2 is a fragmentary view of a portion of the pressure feedback exhaust gas recirculation system of FIG. 1.
Figure 3:
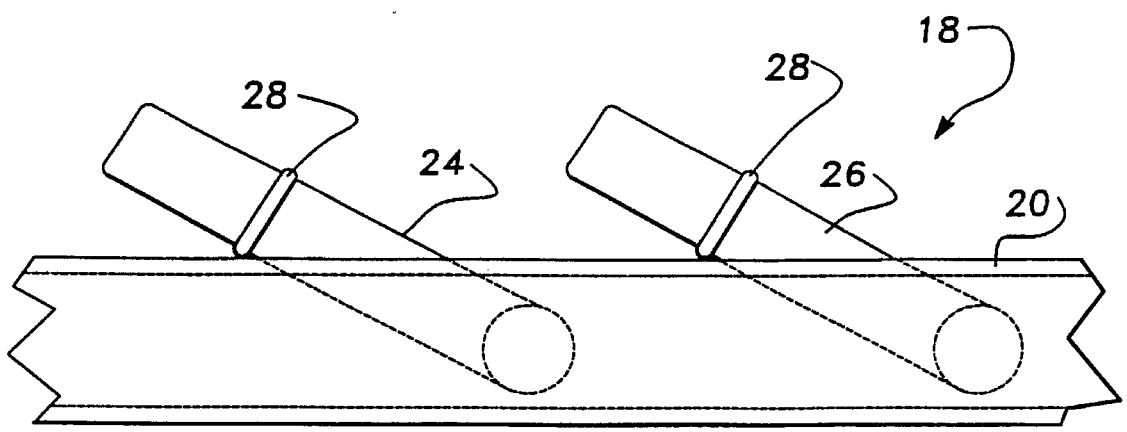
FIG. 3 is a partial elevational view of a portion of the pressure feedback exhaust gas recirculation system of FIG. 1.

The EGR tube 18 also has a first pick-up or pressure tap 24 disposed on one side of the metering orifice 22 and a second pick-up or pressure tap 26 disposed on the other side of the metering orifice 22. As illustrated in FIGS. 2 and 3, the first and second pressure taps 24 and 26 are tubular members having a first annular bead 28 near one end and a second annular bead 30 near the other end. The first and second pressure taps 24 and 26 have the end nearest the bead 30 partially closed to form a restrictor 32 having an orifice 34. The pressure taps 24 and 26 have an internal diameter of approximately six (6.0) millimeters and the orifice 34 has a diameter from approximately two and one half (2.5) millimeters to approximately four (4.0) millimeters. The end of the pressure taps 24 and 26 are inserted through apertures in the body 20 to at least a depth of one (1) millimeter and secured thereto by suitable means such as arc welding. It should be appreciated that the weld is in the area between the bead 30 and the body 20.

Referring to FIG. 1, the EGR system 10 includes a delta pressure feedback exhaust (PFE) sensor 36 and a first conduit 38 interconnecting the sensor 36 and the first pressure tap 24 to receive downstream pressure. The ERG system 10 also includes a second conduit 40 interconnecting the sensor 36 and the second pressure tap 26 to receive upstream pressure. The conduits 38 and 40 are made of an elastomeric material such as silicone rubber. The EGR system 10 includes an electronic control unit 42 electrically connected to the sensor 36 to receive a pressure differential signal from the sensor 36 of the pressure difference across the metering orifice 22.

The EGR system 10 further includes an EGR valve 44 which opens and closes the EGR tube 18 to the intake vacuum passageway 14. The EGR system 10 includes an electronic vacuum regulator (EVR) 46 connected by a first conduit 48 to the EGR valve 44 and a second conduit 50 to the intake vacuum passageway 14. The EVR 46 is also electrically connected to the ECU 42 and receives a variable duty cycle signal to vent or transmit vacuum from the intake vacuum passageway 14.

In operation of the pressure feedback EGR system 10, a source vacuum is created in the intake vacuum passageway 14 due to intake flow through the intake flow passageway 12. The source vacuum is routed through the conduit 50 to the EVR 46 which is controlled by the ECU 42. The EVR 46 receives a twelve (12) volt variable duty cycle input from the ECU 42. Depending upon the signal from the ECU 42, the EVR 46 acts to vent some of the source vacuum and transmit the rest through the conduit 48 to the EGR valve 44. If the EVR 46 receives no signal from the ECU 42 (e.g., zero percent duty cycle), the EVR 46 will vent almost all of the source vacuum to atmosphere. It should be appreciated that the EVR 46 can never fully vent all source vacuum and will transmit approximately 0.7 inches of Hg to the EGR valve 44 when it receives zero percent duty cycle. It should also be appreciated that if a duty cycle of 100% (DC current) is applied to the EVR 46, then a maximum vacuum of 5.5 inches of Hg is transmitted to the EGR valve 44. It should further be appreciated that any duty cycle inbetween corresponds to a vacuum level between 0.7 and 5.5 inches of Hg.

From the EVR 46, the vacuum is routed through the conduit 48 to the EGR valve 44. As vacuum supplied to the EGR valve 44 increases, the EGR valve 44 opens more and increases EGR flow from the EGR tube 18 to the intake vacuum passageway 14. Conversely, as the duty cycle to the EVR 46 is reduced, vacuum to the EGR valve 44 is reduced and, as a result, EGR flow is reduced.

The ECU 42 calculates the EGR flow rate by monitoring the pressure drop across the metering orifice 22 as exhaust gases pass through it. The pressure tap 26 located on the exhaust side of the metering orifice 22 supplies pressure (called upstream pressure) to the sensor 36 as well as the pressure tap 24 located on the EGR valve side of the orifice (called downstream pressure) to the sensor 36. The sensor 36 evaluates these two pressure inputs to determine the pressure difference between the two sides of the metering orifice 22. Based upon the theory that capacitance changes as a function of distance between two conductive plates, sensor 36 is able to calculate a pressure differential by exposing both sides of a conducting ceramic diaphragm to the upstream and downstream pressures. The diaphragm essentially "floats" in response to the differences in pressure. As it varies in height, the corresponding capacitance changes and, as a result, so does the voltage output. The operating range of the sensor is from 0 to 120 inches of water pressure differential. The signal from the sensor 36 ranges from 0.45 volts (at 0 inches of water pressure differential) to 4.55 volts (at 120 inches of water pressure differential) and is supplied to the ECU 42. This signal corresponds to an EGR flow rate which the ECU 42 is now aware of.

From various known operating conditions, the desired percent EGR can be calculated for optimum engine operation. The ECU 42 makes this calculation by referencing an EGR table stored in memory of the ECU 42 which is calibrated. Next, the ECU 42 examines the total flow of air into the intake flow passageway 12. This is done either by a mass air sensor (not shown) or by a speed-density strategy. From here, the ECU 42 then calculates a desired EGR mass flow rate. Following this, the ECU 42 references another calibrated table stored in memory to see what pressure differential corresponds to that EGR mass flow rate. This new desired pressure differential is compared to the one measured by the sensor 36. Based upon the magnitude of the difference found between the two, the duty cycle to the EVR 46 is changed to modulate the EGR valve 44. Opening or closing the EGR valve 44 causes a change in the pressure downstream of the metering orifice 22. It should be appreciated that, since the actual pressure differential is constantly monitored, compared, and adjusted to the calculated desired differential, the EGR system 10 is a closed loop feedback system.

Figure 4:
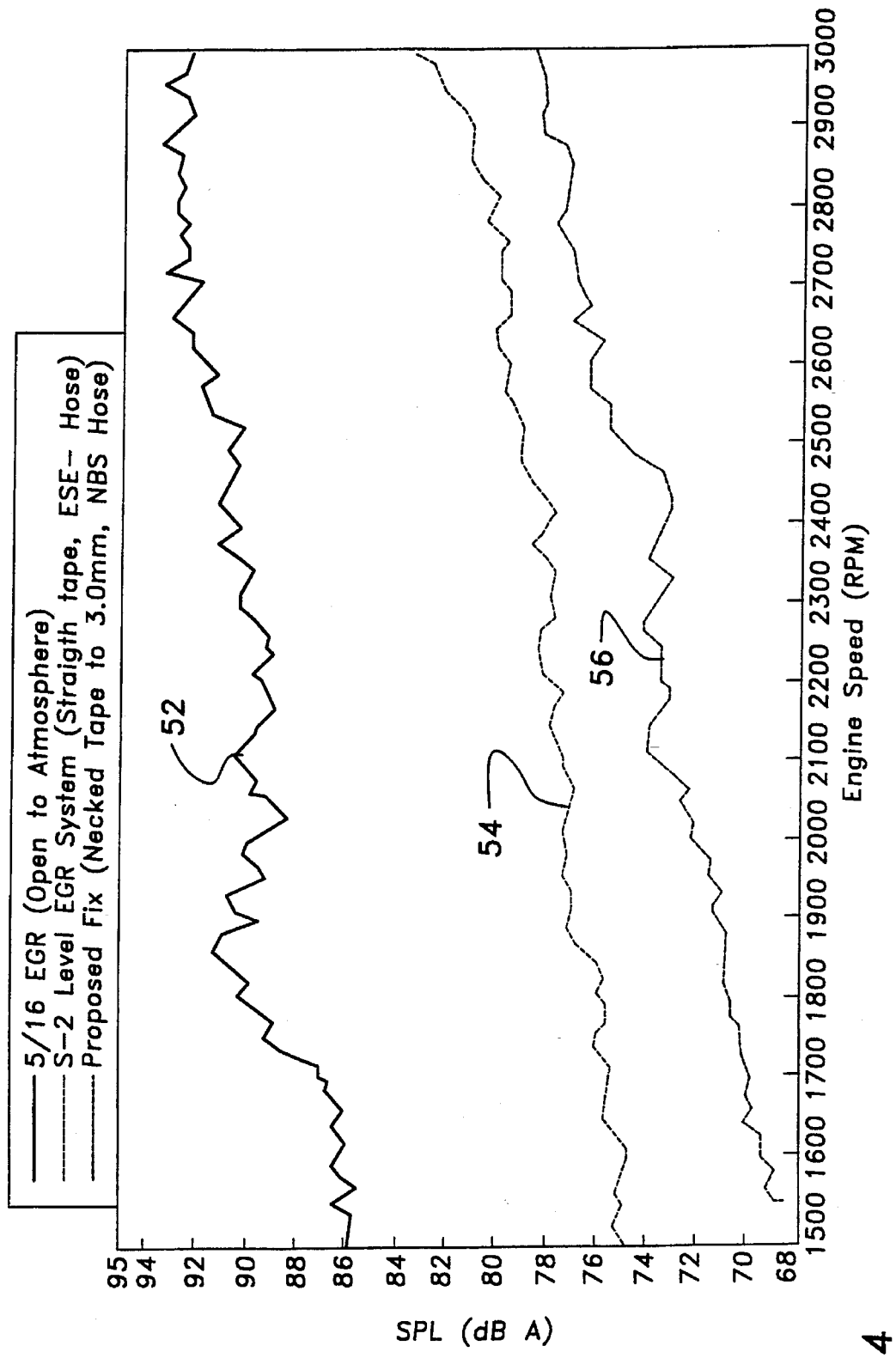
FIG. 4 is a graph of noise versus engine speed for the pressure feedback exhaust gas recirculation system of FIG. 1.
Figure 5:
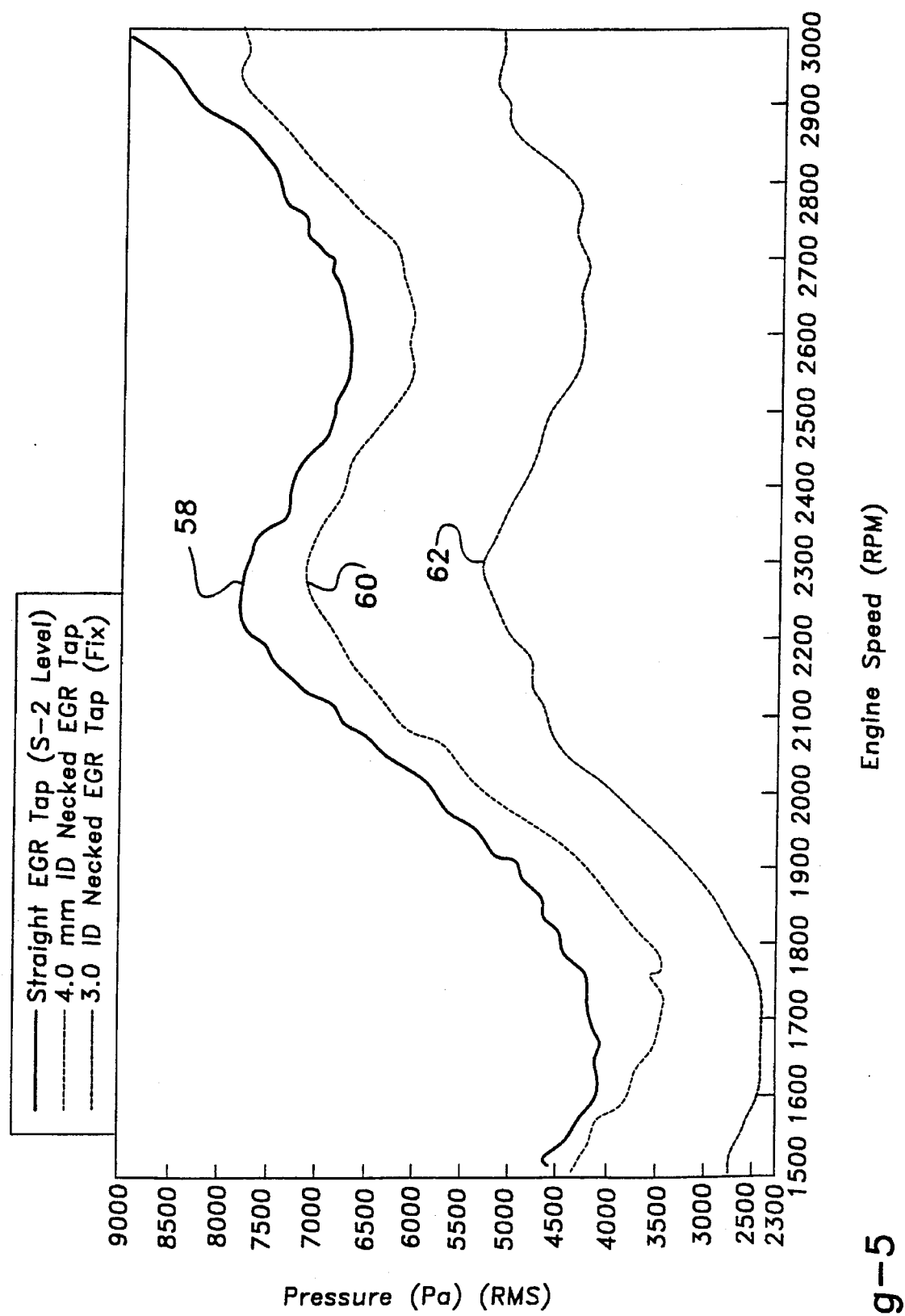
FIG. 5 is a graph of pressure versus engine speed for the pressure feedback exhaust gas recirculation system of FIG. 1.

Referring to FIG. 4, a graph of engine speed (RPM) verses engine compartment sound (dB) for the EGR system 10 is illustrated. The solid curve 52 illustrates the pressure taps 24, 26 open to atmosphere (e.g., the conduits 38 and 40 removed) and has a noise level ranging from approximately 86 dB to 93 dB over an engine speed of 1500 to 3000 RPM. The dotted line curve 54 illustrates the EGR system 10 with the pressure taps 24, 26 having straight taps (e.g., without the restrictor 32 and orifice 34) and has a noise level that ranges from approximately 75 dB to 84 dB over an engine speed of 1500 to 3000 RPM. The phantom line curve 56 illustrates the EGR system 10 with the pressure taps 24, 26 having the restrictor 32 and orifice 34. The EGR system 10 has a noise level from approximately 68 dB to approximately 78 dB over an engine speed of 1500 to 3000 RPM. As a result, the restrictor 32 and orifice 34 in the pressure taps 24, 26 significantly reduces the peak amplitude of noise.

Referring to FIG. 4, pressure (PA) verses engine speed (RPM) is illustrated for the EGR system 10. The solid line curve 58 illustrates the pressure taps 24, 26 without the restrictor 32 and orifice 34. The solid line curve 58 ranges from a pressure level of 4500 PA to 9000 PA over an engine speed of 1500 to 3000 RPM. The dotted line curve 60 illustrates the pressure taps 24, 26 having the restrictor 32 and orifice 34 of a diameter of approximately four (4) millimeters. The dotted line curve 60 has a pressure which ranges from 4500 PA to 8000 PA over an engine speed of 1500 to 3000 RPM. The phantom line curve 62 illustrates the pressure taps 24, 26 having the restrictor 32 and orifice 34 of a diameter of approximately three (3) millimeters. The phantom line curve 62 has a pressure which ranges from approximately 2750 PA to 5000 PA over an engine speed of 1500 to 3000 RPM. Based on this graph, the restrictor 32 having an orifice 34 of approximately 4.0 millimeters significantly reduces the peak amplitude of the pressure pulse across the metering orifice 22 and the restrictor 32 having an orifice 34 of approximately 3.0 millimeters reduces the peak amplitude even further.

Accordingly, the pressure feedback EGR system 10 has a significant reduction in audible noise due to the restrictor 32 and orifice 34 on the pressure taps 24, 26. Also, the pressure feedback EGR system 10 has the restrictor 32 and orifice 34 on the pressure taps 24, 26 which reduce the magnitude of exhaust pulsations across the metering orifice 22.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A pressure feedback EGR system comprising:
   an EGR tube having a metering orifice therein and extending between an exhaust passageway and an intake passageway of the internal combustion engine;
   a first pressure tap connected to said EGR tube on one side of said metering orifice;
   a second pressure top connected to said EGR tube on the other side of said metering orifice; and
   said first pressure tap and said second pressure tap each having an end disposed within said EGR tube and with each said end being partially closed to form an orifice extending therethrough;
   a sensor for measuring a pressure difference across said metering orifice;
   a first conduit interconnecting said sensor and said first pressure tap and second conduit interconnecting said sensor and said second pressure tap;
   an EGR valve for allowing and restricting flow between the exhaust passageway and intake passageway;
   an engine vacuum regulator interconnecting said EGR valve and the intake passageway; and
   an electronic control unit connected to said sensor and said engine vacuum regulator for receiving a signal of the pressure difference from said sensor and outputting a signal to duty cycle said engine vacuum regulator.

2. A pressure feedback EGR system comprising:
   an EGR tube having a metering orifice therein and extending between an exhaust passageway and an intake passageway of the internal combustion engine;
   a first pressure tap connected to said EGR tube on one side of said metering orifice;
   a second pressure top connected to said EGR tube on the other side of said metering orifice; and
   a sensor for measuring a pressure difference across said metering orifice;
   a first conduit interconnecting said sensor and said first pressure tap and a second conduit interconnecting said sensor and said second pressure tap; and
   said first pressure tap and said second pressure tap each having an end disposed within said EGR tube and with each said end being partially closed to form an orifice extending therethrough to reduce noise from pulsations across said metering orifice.

3. A pressure feedback EGR system as set forth in claim 2 wherein said orifice of said first pressure tap and said second pressure tap has a diameter from approximately two and one half (2.5) millimeters to approximately four (4) millimeters.

4. A pressure feedback EGR system as set forth in claim 2 wherein said orifice of said first pressure tap and said second pressure tap has a diameter of approximately three (3) millimeters.

5. A pressure feedback EGR system as set forth in claim 2 wherein said end of said first pressure tap and said second pressure tap extend at least one (1) millimeter into said EGR tube.

6. A pressure feedback EGR system as set forth in claim 2 wherein said first conduit and said second conduit are made of a silicone rubber material.

7. A pressure feedback EGR system as set forth in claim 2 including an EGR valve for allowing and restricting flow between the exhaust passageway and intake passageway.

8. A pressure feedback EGR system as set forth in claim 7 including an engine vacuum regulator interconnecting said EGR valve and the intake passageway.

9. A pressure feedback EGR system as set forth in claim 8 including an electronic control unit connected to said sensor and said engine vacuum regulator for receiving a signal of the pressure difference from said sensor and outputting a signal to duty cycle said engine vacuum regulator.

10. A pressure feedback EGR system comprising:
    an EGR tube having a metering orifice therein and extending between an exhaust passageway and an intake passageway of the internal combustion engine;
    a first pressure tap connected to said EGR tube on one side of said metering orifice;
    a second pressure tap connected to said EGR tube on the other side of said metering orifice; and
    said first pressure tap and said second pressure tap each having an end disposed within said EGR tube and with each said end being partially closed to form an orifice extending therethrough to reduce noise from pulsations across said metering orifice.

11. A pressure feedback EGR system as set forth in claim 10 wherein said orifice of said first pressure tap and said second pressure tap has a diameter from approximately two and one half (2.5) millimeters to approximately four (4) millimeters.

12. A pressure feedback EGR system as set forth in claim 10 wherein said orifice of said first pressure tap and said second pressure tap has a diameter of approximately three (3) millimeters.

13. A pressure feedback EGR system as set forth in claim 10 wherein said end of said first pressure tap and said second pressure tap extend at least one (1) millimeter into said EGR tube.

14. A pressure feedback EGR system as set forth in claim 10 including a sensor for measuring a pressure difference across said metering orifice.

15. A pressure feedback EGR system as set forth in claim 14 including a first conduit interconnecting said sensor and said first pressure tap and a second conduit interconnecting said sensor and said second pressure tap.

16. A pressure feedback EGR system as set forth in claim 15 wherein said first conduit and said second conduit are made of an elastomeric material.

17. A pressure feedback EGR system as set forth in claim 15 wherein said first conduit and said second conduit are made of a silicone rubber material.

18. A pressure feedback EGR system as set forth in claim 14 including an EGR valve for allowing and restricting flow between the exhaust passageway and intake passageway.

19. A pressure feedback EGR system as set forth in claim 18 including an engine vacuum regulator interconnecting said EGR valve and the intake passageway.

20. A pressure feedback EGR system as set forth in claim 19 including an electronic control unit connected to said sensor and said engine vacuum regulator for receiving a signal of the pressure difference from said sensor and outputting a signal to duty cycle said engine vacuum regulator.

* * * * *